Oct. 17, 1967   H. NERWIN   3,347,134

SLIDE MOUNT FOR FILM TRANSPARENCIES

Filed Oct. 13, 1965   4 Sheets-Sheet 1

HUBERT NERWIN
INVENTOR.

BY R. Frank Smith

ATTORNEYS

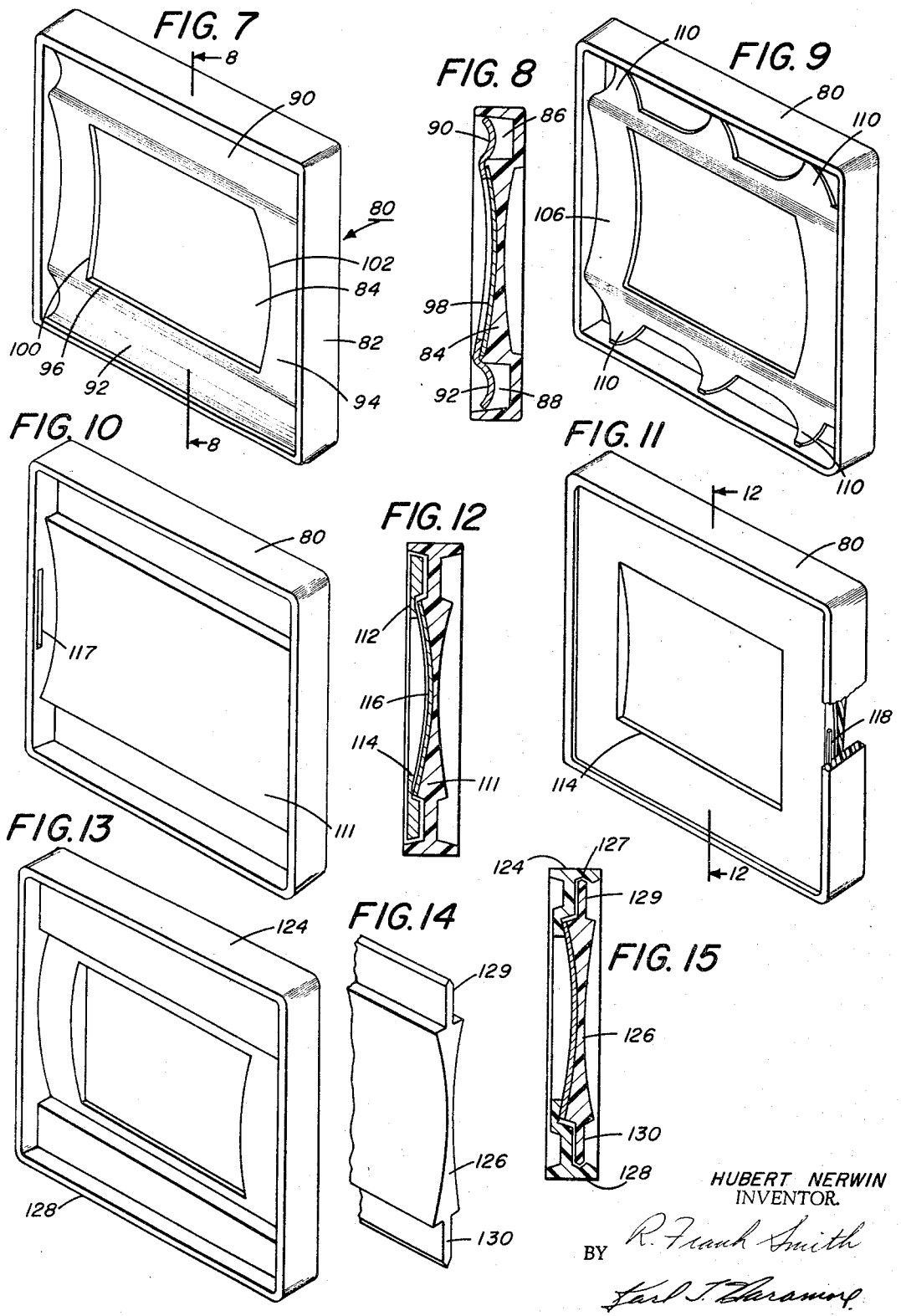

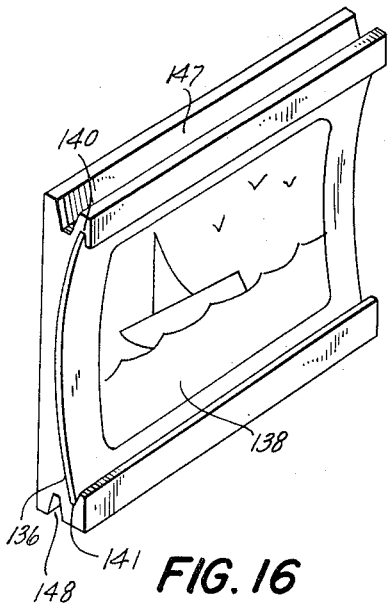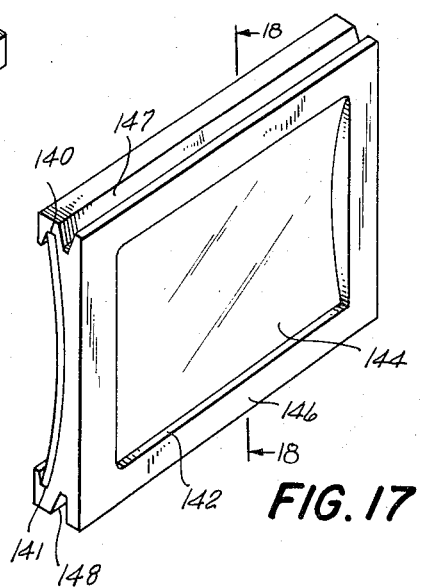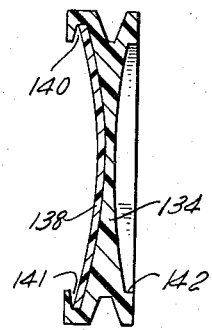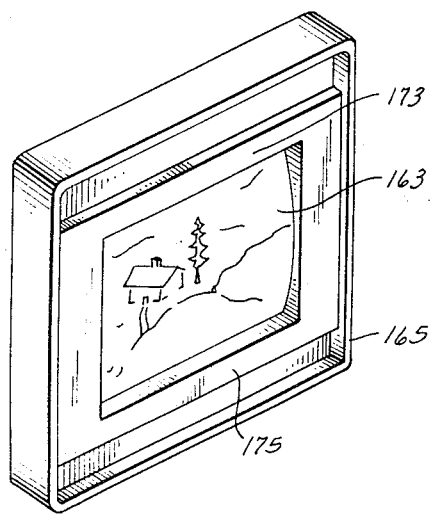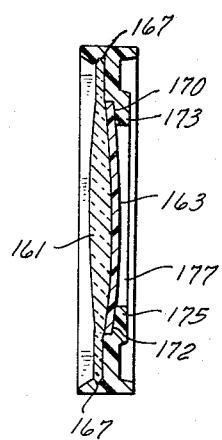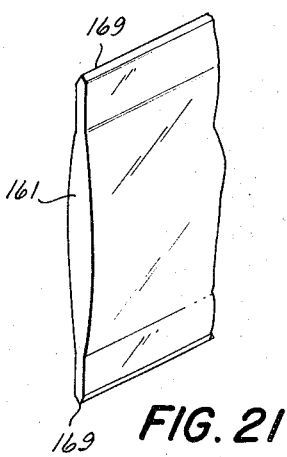

Oct. 17, 1967  H. NERWIN  3,347,134
SLIDE MOUNT FOR FILM TRANSPARENCIES
Filed Oct. 13, 1965  4 Sheets-Sheet 4

INVENTOR
HUBERT NERWIN
BY
ATTORNEY

United States Patent Office 3,347,134
Patented Oct. 17, 1967

3,347,134
SLIDE MOUNT FOR FILM TRANSPARENCIES
Hubert Nerwin, Rochester, N.Y., assignor to Eastman Kodak Company, Rochester, N.Y., a corporation of New Jersey
Filed Oct. 13, 1965, Ser. No. 495,415
16 Claims. (Cl. 88—26)

This invention relates to a photographic slide mount for a film transparency.

It is particularly directed to a film transparency mounting by which an abrupt shifting or flexing of the plane of the mounted film transparency during its exhibition is prevented. An abrupt shifting or flexing of the plane of the film transparency during projection is commonly referred to as "popping." The condition occurs most frequently when the film transparency becomes heated during projection. The result is objectionable and annoying because it is a cause of defocusing of the projected image.

Two separate but related physical characteristics of a film transparency can be considered as determining the extent of the "popping" action.

First, in the manufacture of film, a plurality of layers of gelatin emulsion are coated on one side of a clear plastic support, such as cellulose acetate. The thickness of the gelatin layers, as well as the inherent curl or curvature of the support, determines the resultant curvature of the processed film.

Second, once the film is manufactured, the emulsion coating on one side of the film will absorb moisture to a much greater degree than the support or base side of the film. In absorbing moisture, the emulsion becomes conducive to linear expansion. Thus, when the film transparency is subjected to an ambient atmosphere of high relative humidity, the film transparency tends to curl to such an extent that its emulsion-coated side assumes a convex curvature.

Generally, because of the moisture absorbent characteristics of the emulsion coating, the finished film transparency is supplied to the consumer with an inherent curvature such that the emulsion-coated side is somewhat convex. A film transparency having such a curvature is said to possess "negative curl." It has been found that a film transparency having a negative curl tends to shift abruptly or "pop" from a negative curl to a positive curl (emulsion-coated side concave) while being exhibited in a slide projector, thereby producing the above-mentioned objectionable defocusing effect. Shifting of the film transparency from a negative curl to a positive curl is believed to be due, in part, to the fact that when the transparency is subjected to heat, the moisture, absorbed and contained by the emulsion that is coated on one side of the film, is evaporated, and evaporation causes the emulsion layer to shrink or contract in its linear dimensions. However, because of the inherent negative curl characteristics of the film support, the film support resists this contracting action of the emulsion layer until a sufficient quantity of moisture is evaporated from the emulsion layer such that the stress generated in the emulsion layer will overcome the inherent curl of the support and "pop" the film transparency into a positive curl configuration.

It has been found that the objectionable shifting or "popping" of a film transparency can be eliminated by bowing the transparency out of its normal plane to an extent such that the stress required to impart a bow to the transparency is greater than the contracting action of the emulsion layer when moisture is evaporated. The net effect on the transparency is to prevent it from "popping."

The film to be projected, in the case of original transparencies, is supported with its emulsion side facing the projection lens. The mounting is with a positive or negative cylindrical lens interposed between the film and the projection lens. This places the emulsion side of the transparency in contact with the cylindrical lens.

Duplicate transparencies are printed from original transparencies with their respective emulsion sides toward each other. The duplicate transparency, accordingly, must be projected with its emulsion side facing away from the projection lens to be seen correctly on the projection screen. These duplicates, accordingly, are mounted with a negative or positive cylindrical lens interposed between the transparency and the projection lens. The base of the transparency in such a position is in contact with the cylindrical lens.

By this invention, such cylindrical lenses, acting as field flatteners, may be biconvex or biconcave elements, as the case may be. It is often customary to form these lenses as symmetrical elements, that is, as elements having the same curvature on each side. This eliminates possible wrong insertion of the lens into the transparency mount. It is desirable to point out, however, that some lenses may have a different curvature on their respective sides in order to attain a perfectly flat image plane as seen from the side of the projection lens. In such cases, the cylindrical lens surface of larger radius contacts the transparency and the smaller radius faces the projection lens.

The field flattening lens provides compensation for the cylindrical shape assumed by the transparency in its mounting. The lens and mounting structures to be described herein are inherently simple and permit manufacture of mounts in strip form by extrusion.

With the foregoing in mind it becomes an object of the present invention to provide a slide mount for either original film transparencies or duplicate transparencies which substantially eliminates "popping" of the film transparency at such times as it is subjected to heat during projection.

A fuller understanding of the invention will be had by referring to the following description and claims in conjunction with the accompanying drawings in which:

FIG. 7 is an isometric view showing still another embodiment of a slide mount of this invention with a film transparency mounted in place;

FIG. 8 is a cross-sectional view of the mount shown in FIG. 7 taken along the line 8—8 thereof;

FIG. 9 is an isometric view of another embodiment of a slide mount of this invention constructed in a manner similar to that shown in FIGS. 7 and 8;

FIG. 10 is an isometric view of the lens portion of still another embodiment of a slide mount of this invention;

FIG. 11 is also an isometric view partially cut away of an assembled slide mount for mounting a film transparency sandwiched between the lens portion of FIG. 10 and a frame insert;

FIG. 12 is a cross-sectional view of the slide mount shown in FIG. 11 and taken along the line 12—12 thereof;

FIG. 13 is an isometric view of the frame member of still another embodiment of a slide mount constructed in accordance with this invention;

FIG. 14 is an isometric view of a portion of the lens insert member which is adapted to cooperate with the frame member shown in FIG. 13;

FIG. 15 is a cross-sectional view of a slide mount which is assembled from the frame member of FIG. 13 and the lens insert of FIG. 14;

FIG. 16 is a perspective view showing another embodiment of a slide mount constructed in accordance with this invention and with a film transparency mounted in place;

FIG. 17 is a perspective view of the opposite side of the mount that is shown in FIG. 16;

FIG. 18 is a cross-sectional view of the slide mount taken along the line 18—18 of FIG. 17;

FIG. 19 is an isometric view of a modified mount;

FIG. 20 is a sectional view of the mount of FIG. 19 with a lens and film transparency held therein;

FIG. 21 is a partial isometric view of the lens element of FIG. 20 taken from one lens edge to show the mounting formation;

A brief summary of the invention will aid the understanding of the method and means for carrying out the inventive concepts of this proposal. Generally, the image area of a mounted film transparency is located in registry with the aperture of the mount, with the side portions of the mount that bound the aperture overlying the marginal portions of the transparency to serve both as a support and as a mask of the image area thereof. In the present method and means for mounting a film transparency, opposite edge portions of the film transparency are so engaged and confined that the image area of the transparency is bowed out of its normal plane with a cylindrical curvature imparted thereto. A field flattening lens is included in the mount to provide optical compensation for the cylindrical shape assumed by the transparency when so mounted.

Figure 1:
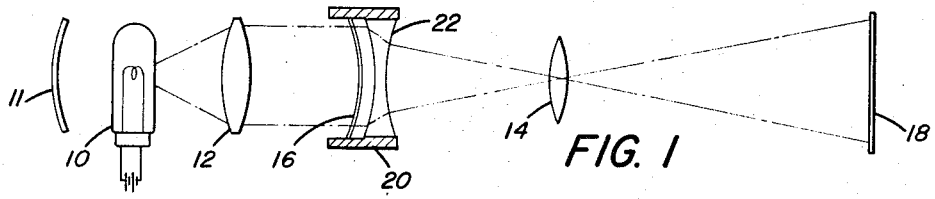
FIG. 1 is a schematic view showing the use of the slide mount of this invention as the transparency is projected for viewing.

By the showing of FIG. 1 there is schematically depicted a general form of a projection system for displaying transparencies. The system normally includes the usual light source 10 with a reflector 11, a condenser lens 12 and objective lens 14 for projecting the image area of a film transparency 16 upon a display screen 18. In each of the embodiments of this invention, the film transparency 16 is carried by a slide mount 20, positioned between the condenser lens 12 and the objective lens 14. Slide mount 20, as will become apparent from the description to follow, has means for imparting a cylindrical curvature to transparency 16 when held in the mounting. The transparency when so curved is able to resist the abrupt shifting or reversing of its curvature during projection which would result in objectionable and annoying defocusing of the projected image.

Slide mount 20 includes a field flattener lens 22 having a concave cylindrical surface facing toward condenser lens 12. The transparency 16 when suitably mounted in the holder then has its cylindrically curved surface located substantially equidistant to, and/or in contact with, the concavely curved surface of lens 22. Thus, lens 22 can act both as a support for the curved transparency 16 and as a field-flattening lens to optically compensate for the cylindrical shape assumed by the transparency in order to obtain sharp definition of the image of the transparency as it is projected onto screen 18. The field flattener lens 22 can be convex, as well as concave, or biconvex or biconcave, as shown. For reasons mentioned above, if the transparency 16 is an original, it will be mounted so that its emulsion side faces the projection lens 14. If, however, the transparency is a duplicate, it will be so mounted that its emulsion side faces away from the projection lens.

Figure 2:
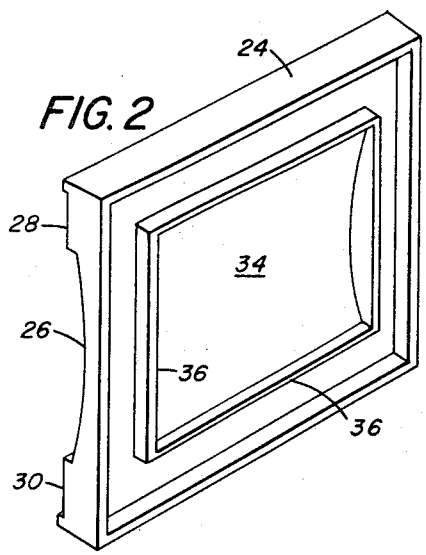
FIG. 2 is a perspective view of one embodiment of a slide mount constructed in accordance with this invention.
Figure 3:
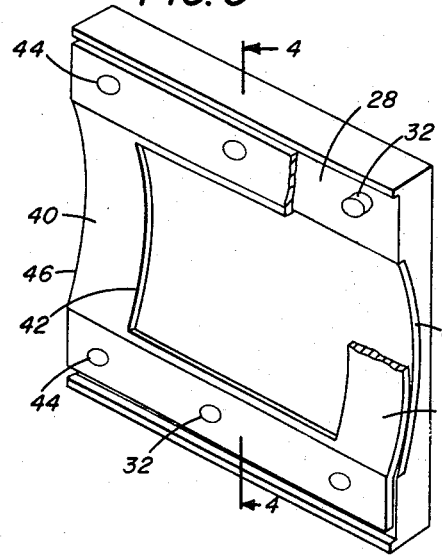
FIG. 3 is a perspective view of the opposite side of the mount shown in FIG. 2 with a portion of the masking frame broken away and a film transparency mounted in place.
Figure 4:
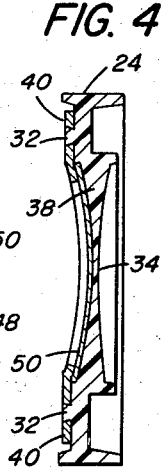
FIG. 4 is a cross-sectional view of the mount taken along the line 4—4 of FIG. 3.

FIGS. 2 through 4 represent one embodiment of this invention providing a substantially rectangular, flat, slide frame 24, formed from a suitable plastic moldable material, which has a recessed concave cylindrical surface 26 formed in one face thereof. The longitudinal axis of the cylindrical surface 26 extends across the face of frame 24 in such manner that a pair of coplanar marginal surfaces 28 and 30 border its respective upper and lower edges. A plurality of extensions or pins 32 are individually spaced along the length of each of the marginal surfaces 28 and 30 and project from the flat surface thereof.

The opposite face of frame 24 is formed to include a centrally disposed substantially rectangular aperture area 34 which is bounded on its four sides by a continuous wall member 36. As best shown in FIG. 4, the surface contour of area 34 is substantially that of a concave cylindrical surface whose longitudinal axis extends parallel to the longitudinal axis of surface 26 so that the surface of area 34, in conjunction with surface 26, defines the surfaces of a field flattening biconcave lens 38.

A rectangular masking frame 40, having a window aperture 42 centrally disposed therein, overlies slide frame 24. A plurality of openings 44 in the upper and lower marginal surfaces of frame 40 match the plurality of spaced extensions or pins 32 on marginal surfaces 28 and 30. The masking frame 40 is secured to slide frame 24 by virtue of the frictional cooperation of extensions or pins 32 with openings 44. In this arrangement the aperture area 34 of slide frame 24 is positioned in registry with aperture 42 of masking frame 40. Side members 46 and 48, respectively, of frame 40 are formed with a curvature therein which corresponds to the curvature of surface 26. Thus when a film transparency 50 is mounted with its emulsion-coated side toward surface 26 and its image area in registry with aperture 42 and aperture area 34, and its marginal portions sandwiched between slide frame 24 and masking frame 40, side members 46 and 48 of frame 40 then engage and confine opposite edge portions to bow the transparency 50 out of its normal plane and impart a cylindrical curvature thereto for the purpose of preventing the "popping" of the transparency within the holder.

Figure 5:
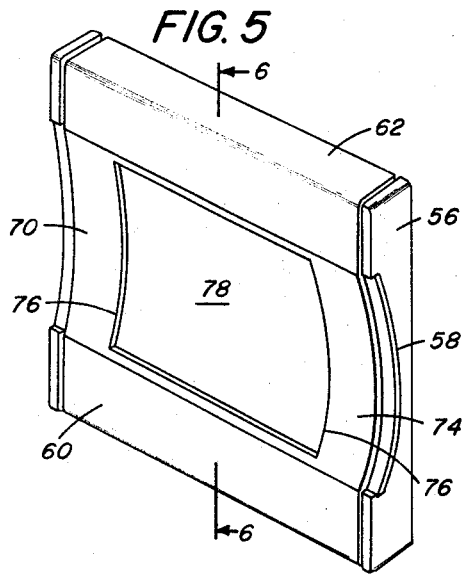
FIG. 5 is an isometric view showing another embodiment of a slide mount constructed in accordance with this invention with a film transparency mounted in place.
Figure 6:
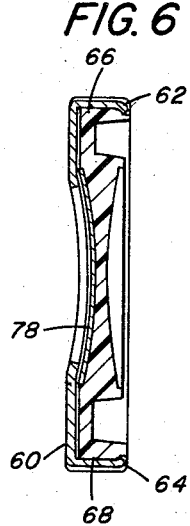
FIG. 6 is a cross-sectional view of the mount taken along the line 6—6 of FIG. 5.

Another embodiment of this invention is shown in FIGS. 5 and 6 wherein a rectangular flat slide frame 56, preferably formed from a suitable light, transparent, plastic material, includes a recessed concave cylindrical surface 58 which extends across one face thereof, in a manner substantially similar to the embodiment shown in FIGS. 2 through 4. A masking frame 60, formed from an opaque resilient material, is adapted to clip over frame 56 and to be secured thereto by virtue of the integrally formed upper and lower curved clip members 62 and 64 which clasp the oppositely recessed marginal portions 66 and 68 of frame 56. Side members 70 and 74 of the aperture 76 of masking frame 60 are formed with a curvature therein which corresponds to the curvature of the recessed surface 58. With this structure the marginal portions of film transparency 78 may be sandwiched between slide frame 56 and masking frame 60 so that side members 70 and 74 will engage and confine opposite edge portions of transparency 78 for the purpose of imparting a cylindrical curvature across the width thereof.

Still another embodiment of this invention is shown by FIGS. 7 and 8 in which the slide mount 80 includes a frame member 82 formed integrally on all its sides. The mount 80 has a central portion formed of a light transmitting material. This includes a pair of concave cylindrical surfaces which form the opposite sides of a field flattening lens 84. A pair of elongated depressions 86 and 88, formed in the same side of the slide mount and adjacent to the upper and lower edges, border the biconcave field flattening lens 84. Depressions 86 and 88 receive the respective curled edges 90 and 92 of a masking member 94, formed from a resilient opaque material, which curled edges are spring fitted into depressions 86 and 88. Once the masking frame is in place, the aperture 96, centrally disposed therein, masks the image area of the film transparency 98 and the side members 100 and 102 of the masking frame 94 depress the marginal portions of the transparency to impart a cylindrical curvature thereto.

FIG. 9 shows still another embodiment of this invention wherein a masking frame 106, which is adapted to cooperate with slide frame 80, includes a plurality of spring fingers 110, which spring fingers are biased toward the marginal walls of the depressions 86 and 88 for the purpose of retaining masking frame 106 in place in a manner substantially similar to that shown in FIGS. 7 and 8.

FIGS. 10, 11 and 12 show still another embodiment of this invention wherein the flat substantially rectangular slide mount includes a pair of concave cylindrical surfaces serving as a biconcave field flattening lens 111 and the rectangular slide mount surrounded by a continuous side wall. A cooperating substantially rectangular masking member 112 having an aperture 114 centrally disposed therein, overlies a film transparency 116 in a manner such that the aperture 114 will be in registry with and mask the image area of the film transparency. A pair of grooves 117 (only one of which is shown) are formed in the surface of the opposite side walls of the continuous wall of frame 80, for the purpose of accepting ribs 118 (only one of which is shown) such that the masking frame is retained in place with the slide mount. If desired, the transparency can be permanently mounted by sealing the masking frame to the slide frame in any suitable permanent manner, such as by heat sealing or ultrasonic sealing.

The structure may be still further modified according to the drawings in FIGS. 13, 14 and 15. By this structure the mount utilizes two parts of which the frame 124 is formed of some suitable opaque plastic, such as polypropylene, and the lens 126 is formed of a transparent plastic. The plastic frame has some flexibility and the lens element can thus be snapped into the frame in the process of mounting the slide or transparency. The frame, for this purpose, has rib-like undercuts 127 and 128 which serve as lens-retaining components. For this purpose the outer edges of the lens 126 are provided with flattened extensions 129 and 130 which fit into the undercuts. The lens, here also, is shown as one of biconcave form, although it should be appreciated that this is illustrative and not limiting.

By FIGS. 16, 17 and 18 the holder is still further modified in form in order to preform the film piece into slightly cylindrical shape to prevent "popping." The window area is formed as a cylindrical lens 134 to provide the necessary optical compensation. By FIG. 16 the cylindrical lens surface 136 is viewed from the lamp side. The transparency 138 is held adjacent to the lens by sliding it into grooves 140 and 141 along the top and bottom of the holder. The emulsion side of the film is then placed adjacent to the cylindrical surface of the lens 134.

The mount is seen from the side facing the projection lens by the FIG. 17 view. The recess 142 is provided to protect the mount face 144 in the picture area against scratching. The frame area 146 is usually opaque so that it may serve as a mask in the holder. The grooves 147 and 148 are used essentially to prevent shrink marks in the molding process of forming the structure.

The mounting structure of FIGS. 19 and 20 is generally similar to that shown by FIGS. 13 and 15 with the exception that it embodies a biconvex lens element 161 which is used in contact with the emulsion side of the transparency 163 to be interposed between it and the projection lens. The use of a convex cylindrical lens in contact with the emulsion side of the film is favoring the natural or "negative" curl of the transparency and may thereby be better suited for prevention of "popping" than a negative lens. The frame 165, like frame 124 of FIG. 15, is undercut along the edges 167. The outer edge 169, of generally V-shape, of the lens 161 is adapted to be sprung into the holder frame 165 and to be held by such undercut. The supported transparency 163 has its outer edegs 170 and 172 rested against the inner ribs 173 and 175 respectively which outline the frame window area 177 through which the transparency is seen.

In the showing, the lens 161 is symmetrical but it should be understood that it is obvious, however, as stated above that the lenses can be produced with a different curvature on their respective sides to attain a perfectly flat image plane as seen from the side of the projection lens. The larger radius of these unsymmetrical cylindrical lenses would thereby be in contact with the transparency and the smaller radius faces to projection lens.

Figure 22:
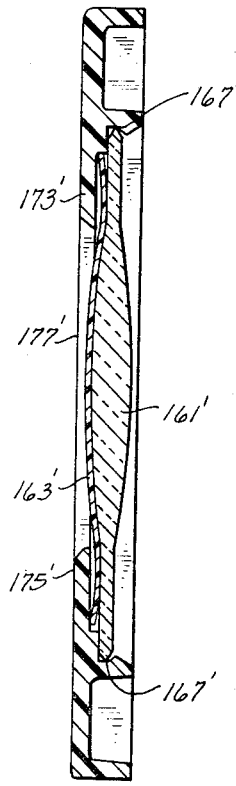
FIG. 22 is a sectional view generally similar to FIG. 20 but showing a modified frame structure and mounting edge.

The modification of FIG. 22 provides a lens generally like that of FIG. 21 with support also being provided by the undercut edge 167'. The biconvex cylindrical lens 161' holds the film transparency to overlap the edges 173' and 175' of the window area 177'.

If desired, any of the lens elements may be provided with edge apertures adapted to overlie a pin element 193 (see FIGS. 23 and 24) formed adjacent to the window area of the frame and adapted to align with edge apertures of a film strip.

Figure 23:
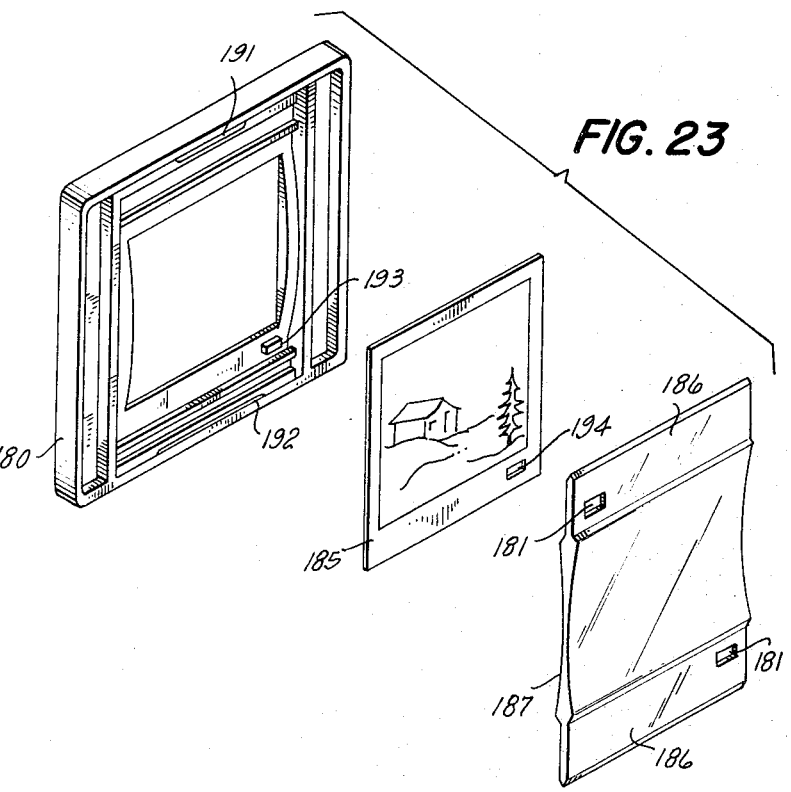
FIG. 23 is an exploded view showing the combination of a holder frame, the film transparency and the cylindrical lens element and showing also the novel means for holding the relative position of the components.
Figure 24:
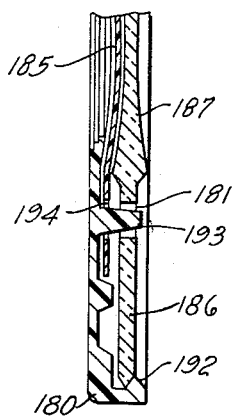
FIG. 24 is a sectional view of a part of the frame with the lens and film locating means.

Reference is now made to the exploded view of FIG. 23. The outer frame 180 will be observed as having fastening ribs 191 and 192 at the top and bottom, respectively for securing the cylindrical field-lens therein. The lens is held in the general fashion shown in FIGS. 13 and 15 in particular. The modification shown in FIGS. 23 and 24 provides a post structure 193 in one corner of the frame. This is engaged, as seen more particularly by FIG. 24, with both the film transparency 185 and the edge 186 of the field-lens 187 (in this case a biconcave element having flattened edges 186 in which an aperture is located on either side in diagonally opposite positions). The aperture 181 which will thus locate the lens is adapted to be positioned over the post 193 with which the film transparency 185 is registered by way of an aperture 194 in one corner thereof. Actually, the lens is provided so that it may be turned through 180° without having effect on the projection, whereas the film transparency must be properly positioned relative to the hole for correct projection and in order that the scene shall be correctly shown. When the components are assembled and the edge 186 of the lens is positioned behind the rib 191 or 192 the film transparency is held adjacent to the lens as shown particularly by FIG. 24 and the combination is ready for projection in the manner already explained.

It will be clear, of course, that if it is desired to project films having sprocket holes along the edge, one of the sprocket holes may be aligned with the pin 193 to provide the same effect as shown by the relative positioning of the film transparency 185.

Various modifications, of course, may be made without departing from what is here shown.

Having now described the invention what is claimed is:

1. A slide mount for film transparencies comprising a frame element having a central viewing area, a masking border area thereabout, a substantially cylindrical optical lens element adapted to be supported within the frame element, and means for securing the frame and optical elements together thereby to hold and locate a film transparency within the frame element and adjacent to the optical element so that the transparency is bowed from its normal plane and substantially cylindrical curvature is imparted thereto for projection.

2. A slide mount structure for film transparencies comprising a substantially rectangular frame element having a viewing window area located substantially centrally therein, means along opposite border areas of the frame adapted for engaging and confining opposite edge portions of a film transparency and thereby to bring the image area thereof into a bowed position and impart a substantially cylindrical curvature thereto for projection, and a cylindrical lens element for holding the transparency positioned relative to the window and adjacent to the lens.

3. A slide mount for film transparencies comprising a substantially rectangular frame element having a substantially centrally located viewing area with frame areas adjacent thereto providing a film masking border area, a substantially cylindrical optical lens element extending within the frame element between opposite side members, and means for securing the frame and optical elements together with a film transparency therebetween to hold and locate the film transparency within the frame element and adjacent to the optical element so that the transparency is bowed from its normal plane and cylindrical curvature is imparted thereto.

4. A slide mount for original film transparencies comprising a cylindrical lens element, a frame element having a masking border forming substantially centrally thereof a window area through which a film transparency may be projected and means for securing the frame and lens element together with the lens element positioned to occupy the frame window and adapted, in cooperation with the frame, to support a film transparency for projection, the film transparency being bowed from its normal plane and adapted to have the film emulsion side adjacent to the cylindrical lens element, thereby to provide cylindrical curvature to the film for projection.

5. A slide mount for duplicate film transparencies comprising a cylindrical lens element, a frame element having a masking border forming substantially centrally thereof a window area through which a film transparency may be projected and means for securing the frame and lens element together with the lens element positioned to occupy the frame window and adapted, in cooperation with the frame, to support a film transparency for projection, the film transparency being bowed from its normal plane and facing away from the cylindrical lens element, thereby to provide cylindrical curvature to the film for projection.

6. The combination claimed in claim 4 comprising, in addition, notch elements on opposite edges of the film frame and laterally projecting edges on opposite sides of the cylindrical lens element for engagement with the frame notches, thereby for removably attaching the frame and lens.

7. A slide mount structure claimed in claim 4 wherein the frame is flexible and wherein the frame is provided with a pair of recesses located along opposite edges, and fastening means secured at opposite sides of the lens element for positioning within the frame recesses thereby to secure the lens and frame and to position a film transparency in registry with the lens element.

8. A slide mount for film transparencies comprising a substantially cylindrical lens element, a rectangular frame element having a substantially centrally located window through which a film transparency may be projected with the frame side members providing a masking area, means for securing the frame and lens element together with the lens element positioned to fill the frame window area and adapted, in cooperation with the frame, to support a film transparency for projection with the film transparency bowed from its normal plane and having the transparency adjacent to the cylindrical lens element thereby to provide cylindrical curvature to the film for projection.

9. A combination claimed in claim 8, comprising, in addition, a plurality of notch elements in opposite edges of the frame and resilient means to secure the cylindrical lens element to the opposite sides of the frame and within the notches.

10. The slide mount structure claimed in claim 8 wherein the frame is flexible and wherein the frame is provided with a pair of recesses located along opposite edges, and resilient holding clip means secured at opposite sides of the frame and positioned within the recesses thereby to secure the lens and frame and to position a film transparency in registry with the lens element.

11. The mount claimed in claim 10 wherein the lens is biconcave and compensates for film curvature in mounting.

12. The mount claimed in claim 10 wherein the lens is biconvex and compensates for film curvature in mounting.

13. The structure claimed in claim 3, comprising, in addition, a field flattening lens supported substantially adjacent to the cylindrical lens to provide optical compensation for the cylindrical shape into which the transparency is formed.

14. The slide mount claimed in claim 8, comprising, in addition, a field flattening lens supported substantially adjacent to the cylindrical lens to provide optical compensation for the cylindrical shape into which the transparency is formed.

15. A slide mount structure for film transparencies comprising a frame element having a viewing window area located substantially centrally therein, the said frame external to the window serving to mask the edge areas of a film transparency, a film and lens locating pin positioned on the frame adjacent to the window area and adapted to orient a film frame having an edge aperture adapted to overlie said pin, means located within the border area of the frame for engaging and confining the located film at its opposite edges to bow the same to a substantially cylindrical curvature, a lens element having a cylindrical central portion of substantially the area of the window adjacent to which the bowed film is adapted to rest, said lens having two substantially flat border areas adjacent the cylindrical area with an aperture therein adapted for registry with the frame pin, and means within the frame edge areas for supporting the lens element within the frame adjacent to the bowed film and in registry with the frame pin.

16. A slide mount for a film transparency having an inherent substantially cylindrical curvature of a given radius and which slide mount will prevent said film transparency from "popping" during projection, and comprising:
a frame element;
a projection aperture located substantially centrally of said frame element with which the image area of the transparency is registered when the transparency is placed in the slide mount; and
means on said frame element adjacent two opposite edges of said aperture for engaging and confining the bowed edges of said transparency, said means having a radius of curvature different from said inherent curvature of said transparency.

References Cited

UNITED STATES PATENTS

| 2,863,421 | 12/1958 | Lyon et al. | 40—152 |
| 2,958,971 | 11/1960 | Plettner | 40—152 |
| 2,968,108 | 1/1961 | Knox | 40—152 |
| 3,013,354 | 12/1961 | Wiklund | 40—152 |
| 3,041,762 | 7/1962 | Knox | 40—152 |

EUGENE R. CAPOZIO, *Primary Examiner.*

W. J. CONTRERAS, *Assistant Examiner.*